Oct. 11, 1966 W. J. BROREIN 3,278,809
TINSEL SPLICE DETECTOR
Filed Oct. 16, 1963
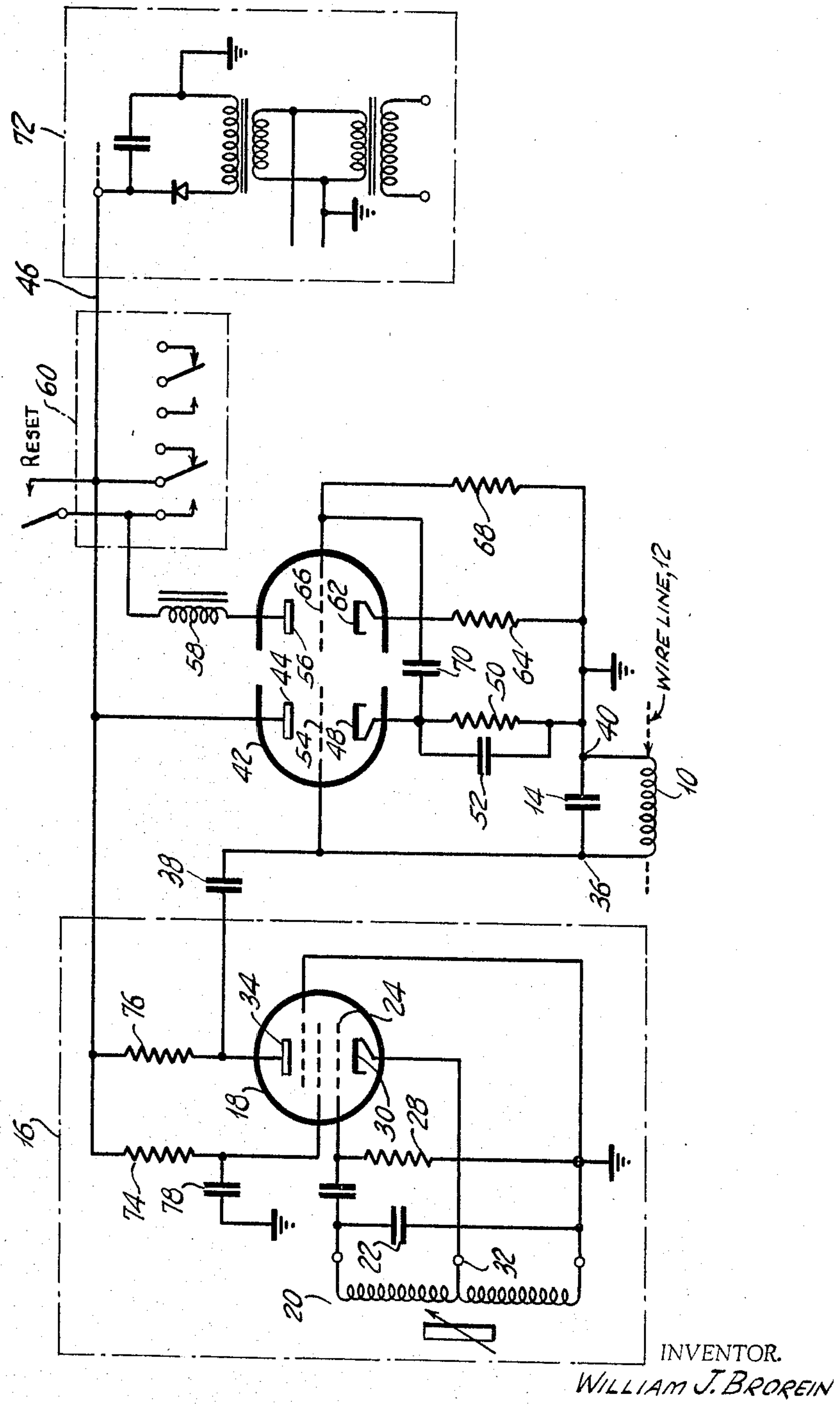
INVENTOR.
WILLIAM J. BROREIN
BY
Emery Whittemore Sandoe & Graham
ATTORNEYS United States Patent Office 3,278,809
Patented Oct. 11, 1966

3,278,809
TINSEL SPLICE DETECTOR

William J. Brorein, Whippany, N.J., assignor to General Cable Corporation, New York, N.Y., a corporation of New Jersey Filed Oct. 16, 1963, Ser. No. 316,603
4 Claims. (Cl. 317—142)

This invention relates to an improved splice detector for tinsel conductors.

During the manufacture of tinsel conductors which are small copper conductors drawn to fine diameter and then flattened, steel splice sleeves are used to couple the end of one length of the copper conductor to the beginning of the next length. This coupling is effected to enable continuous manufacture drawing the wire through the manufacturing equipment without interruption.

However, before conductors are assembled as, for example, in telephone cable, the steel splice sleeves must be removed. Since the sleeves are difficult to detect, it is also necessary that the assembled conductors be inspected to prevent fabrication of telephone cable having the steel splice sleeves included therein.

It is, therefore, a primary object of the present invention to provide a detector to detect the presence of steel splice sleeves on tinsel conductors even after the conductor is assembled in a cable, which detector is of economical manufacture and is capable of being installed in various operating positions without elaborate installation and/or tuning procedures.

In accordance with this object, there is provided, in a preferred embodiment of the present invention, a pickup coil comprising a wire wound single layer coil of fairly high Q. The diameter of the pickup coil is preferably of the order of ½-inch to enable the passage of multiple conductor jacketed cords therethrough and detecting of splice sleeves therein without disabling the coil from testing of individual conductors. One end of this coil is preferably grounded and a large tuning capacitor is coupled in parallel therewith to provide a tuning circuit tuned to a frequency preferably between one and two mc./s. At this frequency, the sensitivity of the tuned detector coil is sufficiently high for the detection of the splicing sleeves and the stability of the circuit without temperature regulation, voltage regulation and shielding is sufficiently high to provide a rugged, portable and small detection unit.

The tuned detection coil is excited by a radio frequency signal from a RF oscillator to which the coil is loosely coupled by a capacitance coupling. The detection coil is coupled to a high impedance detector.

As the conductor is drawn through the detector coil, the amplitude of the signal at the high impedance detector will remain substantially constant since the conductor is of nonmagnetic material. However, when the steel splice enters the tuning coil, the eddy current losses in the small splice coupled with the change of inductance caused by the splice being pulled into the coil of the parallel tuned circuit will provide a change of output voltage which is utilized to energize an alarm circuit, indicating the presence of the steel splice sleeve.

Having briefly described this invention, it will be described in greater detail along with other objects and advantages in the following portions of the specification, which may best be understood by reference to the accompanying figure which is a schematic diagram of the splice detector constructed in accordance with the present invention.

In the figure, there is shown the detector coil 10 through which the wire 12 is drawn by mechanical drive arrangements conventional to the art. The wire line may comprise individual tinsel conductors or may, for example, comprise a multiple conductor jacketed cord using a plurality of tinsel conductors in the fabrication thereof.

Capacitor 14 is coupled across the detector coil 10 and comprises a large capacitance which will provide a parallel tuned circuit, tuned to a resonant frequency in the range of one to two mc./s.

In order to energize the tuned circuit including the detector coil, an oscillator 16 is provided which comprises a pentode 18 having a tuned tank circuit comprising coil 20 and capacitor 22 coupled in parallel fashion. The top of the tuned tank circuit is coupled to the grid 24 through capacitor 26 and the bottom of the tank circuit is grounded. A grid leak resistor 28 is provided. A feedback is provided by coupling the cathode 30 to tap 32 on the coil 20.

The oscillator is tuned to oscillate at the resonant frequency of the detector coil 10 and its parallel capacitance 14. The output derived from the anode 34 is loosely coupled to terminal 36 of the tuned detector circuit by a small capacitance 38. The other terminal 40 of the detector circuit is grounded to minimize the effects of the stray capacitance. A high impedance detector is provided by the dual triode 42. The input section is operated with the anode 44 coupled directly to B+ via line 46 and the cathode 48 coupled through resistor 50 to ground. An RF bypass capacitor 52 is coupled across resistor 50. The tuned detector circuit has terminal 40 coupled to ground and terminal 36 coupled to the grid 54. The signal across the splice detector coil 10, being directly coupled to the grid 54 is rectified and appears as a positive D.C. voltage at the cathode 48.

The second section of tube 42 has the anode 56 coupled through the holding coil 58 of relay 60 to B+, the cathode 62 coupled through resistor 64 to ground and the grid 66 coupled through resistor 68 to ground. The cathode 48 is coupled through coupling capacitor 70 to the grid 66. The B+ supply 72 is preferably a conventional rectifier source.

The oscillator is adjusted to operate at the resonant frequency of the tuned detector coil 10 and its parallel capacitance 14. In order that the coil be adaptable for the detection of splices in operation, the coil should be of reasonably large diameter so as to enable passage of multiple conductor jacketed cords therethrough. For this reason, the detector coil 10 is desirably wound on a tubular coil form with an inside diameter of ½-inch and an outside diameter of ¾-inch. The coil itself should be of fairly high Q so as to provide adequate sensitivity. A coil consisting of seventy turns of No. 33 enamel wire in a single layer on the ¾-inch coil form has been found satisfactory.

In order to have sufficient sensitivity with stability of a portable rugged instrument, an operating frequency for the oscillator and the tuned detector coil should fall within the range of 1 mc./s. to 2 mc./s. The oscillator 16 oscillates at the resonant frequency of the detector coil in the range specified and is an electron coupled oscillator. This type of oscillator is chosen to minimize loading and frequency pulling on the oscillator circuit and, thus, provides a stable source of excitation for the detector resonant circuit.

The oscillator is coupled to the detector coil loosely through a small capacitor 38 and the signal developed across the detector coil is rectified by the first stage of tube 42 appearing as a positive D.C. voltage on cathode 48. Nonmagnetic material passing through coil 10 has little effect on the amplitude of the signal appearing across the coil and as a result, the D.C. voltage at cathode 48 remains steady. However, if a steel splice enters the coil 10, the losses of the coil are increased due to the eddy current losses in the steel sleeve. Simultaneously, the inductance is changed by the steel sleeve. Thus, simultaneously, the Q of the coil is lowered and the circuit is detuned from the exciting frequency. In the frequency range discussed, this change is easily detected, appearing as a negative pulse at cathode 48, which pulse is coupled by capacitor 70 to a grid 66 of a second section of tube 42. The negative pulse at grid 66 causes a drop in plate current, thus, releasing relay 60 which can be utilized to actuate an external alarm or control to indicate the presence of splice sleeve in the cable or conductor being inspected. For the purpose of complete disclosure but not by way of limitation, Table I is provided which lists the operating component values in a typical operating circuit.

*Table I*

| Reference Numeral | Component | Identification |
|---|---|---|
| 18 | Vacuum tube | 6AU6. |
| 20 | Slug tuned coil | Miller No. 73 oscillator coil. |
| 22 | Capacitor | 150 mmf. |
| 26 | do | 100 mmf. |
| 28 | Resistor | 56 K. |
| 78 | Capacitor | .01 mf. |
| 74 | Resistor | 22 K. |
| 76 | do | 56 K. |
| 38 | Capacitor | 10 mmf. |
| 10 | Coil | 70 turns No. 33 ¾ O.D. form. |
| 14 | Capacitor | 180 mmf. |
| 50 | Resistor | 56 K. |
| 52 | Capacitor | .01 mf. |
| 42 | Vacuum tube | 12AU7. |
| 70 | Capacitor | .1 mf. |
| 64 | Resistor | 100. |
| 68 | do | 560 K. |
| 58 | Relay Holding Coil | 5,000 ohms. |

This invention may be variously modified and embodied within the scope of the subjoined claims.

What is claimed is:

1. A splice detector to detect the presence of very small ferrous splice sleeves on fine tinsel conductors as said spliced conductors are moved at high speed past said detector, comprising a detector coil, said coil being formed as an elongated coil having a high Q, a first capacitor coupled across said detector coil, said detector coil and said first capacitor being tuned to a resonant frequency, a high frequency oscillator, said oscillator being a free-running stable oscillator tuned to oscillate at said resonant frequency of said detector coil and said first capacitor, a capacitor coupling means to couple said oscillator output across said detector coil and said first capacitor, said capacitor coupling means comprising a capacitor of high impedance with respect to the impedance of said first capacitor to loosely couple said oscillator output across said detector coil and said first capacitor, means for moving said tinsel conductor through said detector coil, and a high impedance voltage detector for detecting voltage changes across said detector coil and first capacitor as said ferrous splice sleeves pass through said coil, in which said high impedance voltage detector includes a triode having plate, grid and cathode electrodes at the input thereto, a cathode resistor coupled between the cathode electrode of said triode and ground, a second capacitor coupled across said cathode resistor, means coupling said detector coil between said grid electrode and the grounded end of said cathode resistor, said cathode resistor and said second capacitor having a long time constant with respect to the period of one cycle of said resonant frequency, means coupling said plate electrode to a unidirectional source, and means for deriving a signal from said cathode electrode indicative of the passage of a ferrous splice sleeve through said detector coil, and in which the time constant of said cathode resistor and said second capacitor is short with respect to the time required for the splice sleeve to pass through the field of said detector coil.

2. A splice detector in accordance with claim 1 in which said coil is developed as a single layer coil to provide the maximum physical length and, thus, to provide maximum length of detector coil signal when the splice sleeve is within the coil.

3. A splice detector to detect the presence of very small ferrous splice sleeves on fine tinsel conductors as said spliced conductors are moved at high speed past said detector, comprising a detector coil, said coil being formed as an elongated coil having a high Q, a first capacitor coupled across said detector coil, said detector coil and said first capacitor being tuned to a resonant frequency, a high frequency oscillator, said oscillator being a free-running stable oscillator tuned to oscillate at said resonant frequency of said detector coil and said first capacitor, a capacitor coupling means to couple said oscillator output across said detector coil and said first capacitor, said capacitor coupling means comprising a capacitor of high impedance with respect to the impedance of said first capacitor to loosely couple said oscillator output across said detector coil and said first capacitor, means for moving said tinsel conductor through said detector coil, and a high impedance voltage detector for detecting voltage changes across said detector coil and first capacitor as said ferrous splice sleeves pass through said coil, in which said detector means comprises a dual triode having a first section and a second section, each section having grid, plate and cathode electrodes, a first cathode resistor coupled between the cathode electrode of said first section and ground, a second capacitor coupled across said cathode resistor, means coupling said detector coil between said grid electrode of said first section and the grounded end of said cathode resistor, a capacitor coupling the cathode electrode of said first section to the grid electrode of said second section, the plate of said first section being coupled to a unidirectional source, and indicator means coupling the plate of said second section to said source.

4. A splice detector in accordance with claim 3 in which said indicator means comprises a fast release relay normally held in the closed position by conduction of said second section of said triode, and released upon movement of a splice sleeve through said detector coil.

References Cited by the Examiner

UNITED STATES PATENTS

| | | | |
|---|---|---|---|
| 2,237,254 | 4/1941 | Broekhuysen | 328—1 X |
| 2,404,026 | 7/1946 | Beard et al. | 329—139 X |
| 2,580,670 | 1/1952 | Gilbert | 328—5 X |
| 2,587,631 | 3/1952 | Kuehne | 324—34 |
| 2,914,726 | 11/1959 | Harmon | 331—65 X |
| 2,928,043 | 3/1960 | Foerster | 324—34 |
| 2,939,073 | 5/1960 | Eul | 324—34 |
| 3,059,749 | 10/1962 | Zinke | 324—34 X |
| 3,064,184 | 11/1962 | Watkiss | 324—34 X |
| 3,159,784 | 12/1964 | Haslett et al. | 324—34 |

ARTHUR GAUSS, *Primary Examiner.*

M. LEE, J. JORDAN, *Assistant Examiners.*